F. B. SNYDER.
VEHICLE BRAKE.
APPLICATION FILED APR. 22, 1920.
1,401,005.
Patented Dec. 20, 1921.
2 SHEETS—SHEET 1.
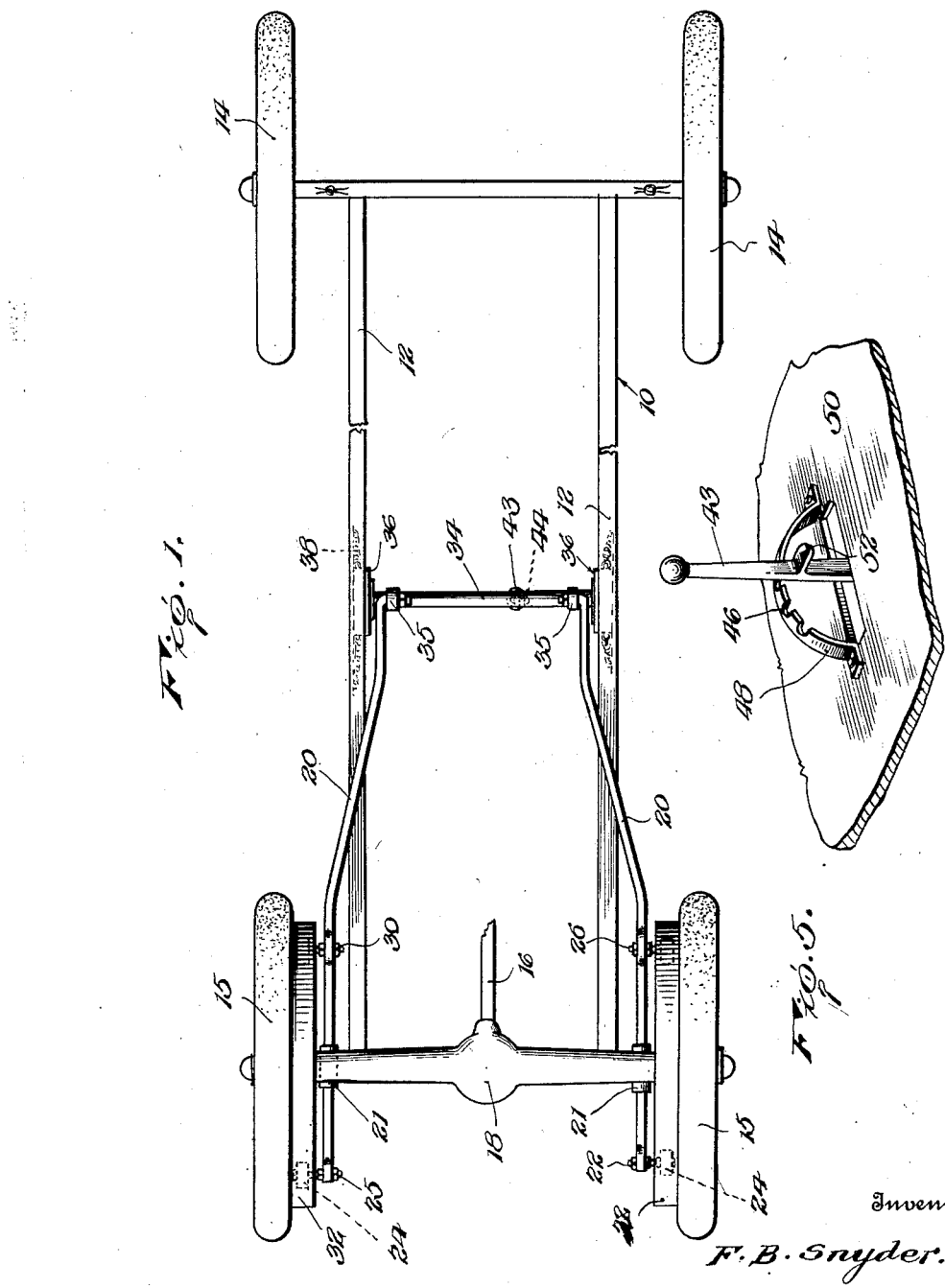

F. B. SNYDER.
VEHICLE BRAKE.
APPLICATION FILED APR. 22, 1920.
1,401,005.
Patented Dec. 20, 1921.
2 SHEETS—SHEET 2.
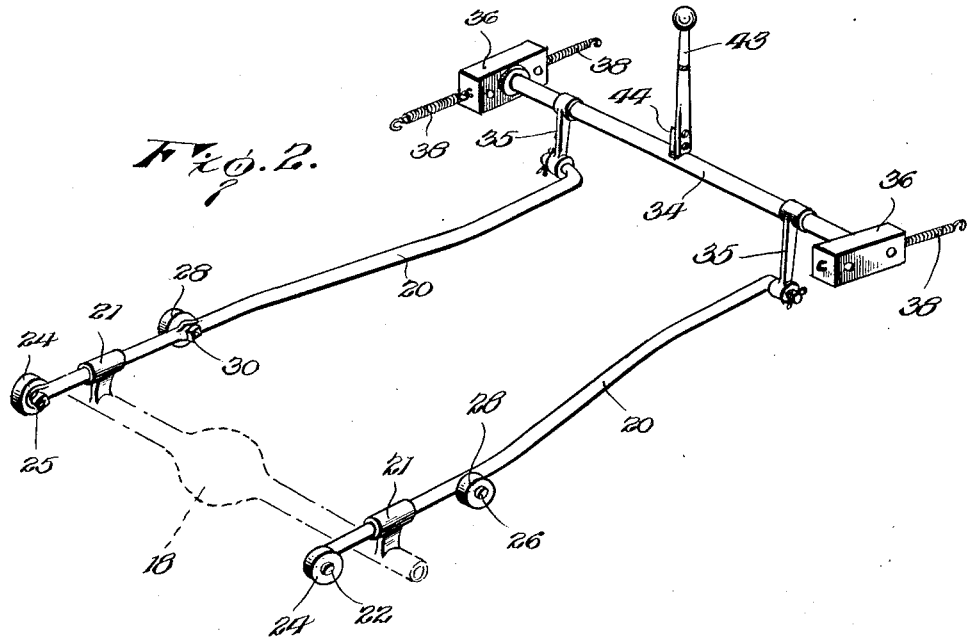
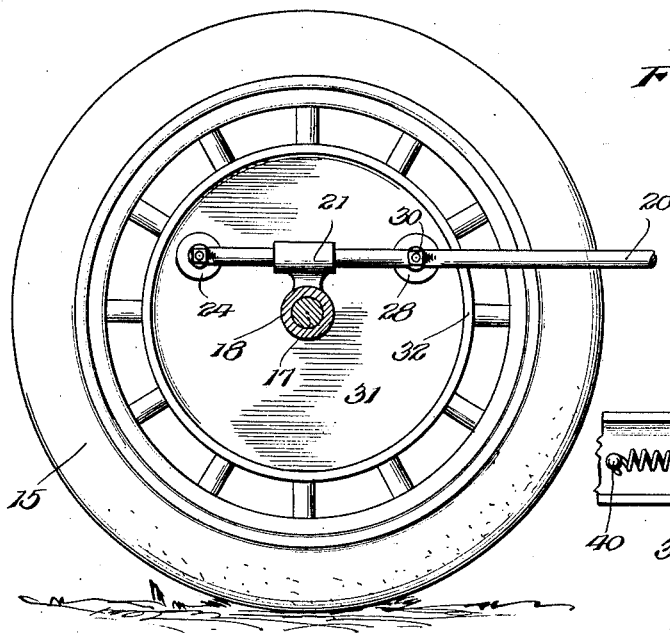
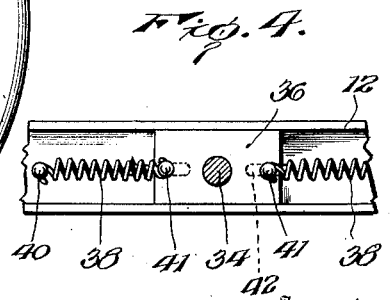
Inventor
F. B. Snyder.
By Lacy & Lacy, Attorneys

UNITED STATES PATENT OFFICE.

FRANK B. SNYDER, OF ALTOONA, PENNSYLVANIA.

VEHICLE-BRAKE.

1,401,005.  Specification of Letters Patent.  Patented Dec. 20, 1921.

Application filed April 22, 1920. Serial No. 375,814.

*To all whom it may concern:*

Be it known that I, FRANK B. SNYDER, a citizen of the United States, residing at Altoona, in the county of Blair and State of Pennsylvania, have invented certain new and useful Improvements in Vehicle-Brakes, of which the following is a specification.

This invention relates to improvements in brakes especially adapted for use on motor vehicles.

An important object of this invention is to provide a vehicle brake having novel means whereby slowing up of the vehicle upon descending long hills may be accomplished in a highly convenient manner.

A further object of this invention is to provide a vehicle brake having a comparatively small braking surface so as to reduce friction and wear to a minimum.

A further object of the invention is to provide a vehicle brake having novel means whereby the same may be operated by the hands or feet of the operator of the vehicle with equal efficiency and convenience.

A further object of the invention is to provide a vehicle brake which is simple to operate, desirable in use and cheap to manufacture.

Other objects and advantages of the invention will be apparent during the course of the following description.

In the accompanying drawings forming a part of this application and in which like numerals are employed to designate like parts throughout the same, Figure 1 is a bottom plan view of a vehicle frame having the improved braking apparatus applied thereto, Fig. 2 is a perspective of the improved brake detached, Fig. 3 is a fragmentary side elevation of the improved brake applied.

Fig. 4 is a detail section through the brake, the view illustrating the means for yieldably connecting the same to the vehicle frame, Fig. 5 is a perspective of the operating means for the brake.

In the drawing wherein for the purpose of illustration is shown a preferred embodiment of the invention, the numeral 10 generally designates a vehicle frame provided, as usual, with spaced parallel side members or bars 12 which are U-shaped in cross section. The frame 10, as is obvious, is supported by front wheels 14 and by rear traction wheels 15 which latter are driven by a motor having connection with a drive shaft 16. The means employed for connecting the drive shaft 16 to the rear traction wheels 15 comprises an axle 17 operating within the rear housing 18.

The improved braking apparatus comprises a pair of operating rods 20 arranged above the frame 10 and slidably extending through a pair of spaced parallel sleeves 21 formed on the upper side of the rear axle housing 18. As illustrated particularly in Fig. 2, the rear end portions of the rods 20 are provided with laterally projecting pins or pivot bolts 22 which rotatably support a pair of shoes 24 which are in the form of rollers. The rollers 24 may be of such wear resisting material as fiber or the like. The shoes 24 which are rotatable on the laterally projecting pins 22 may, as the occasion requires, be replaced since the pivot bolts 22 are secured to the rods by fastening nuts 25.

The rods 20 are provided with a second set of laterally projecting pivot bolts 26 in advance of the sleeves 21 and which rotatably support shoes 28 in the form of rollers. The rollers 28 may also be replaced from time to time since the pivot bolts 26 are detachably secured to the rods 20 by fastening nuts 30.

As illustrated in Fig. 3, a drum 31 is secured to the inner side of each traction wheel and is provided with an annulus or continuous laterally projecting flange 32 which surrounds the rollers 24 and 28. It will be noted that the annulus or flange 32 is of a considerably greater diameter than the space between the rollers 24 and 28 so that the rollers are normally spaced from contact with the inner face of the drum.

The means employed for moving the rods 20 longitudinally for engaging the rollers with the inner faces of the drums comprises a transversely extending shaft 34 having laterally projecting cranks 35 to which the forward portions of the rods 20 are pivotally connected.

As particularly illustrated in Figs. 2 and 4, the end portions of the transversely extending crank shaft 34 are rotatably extended into bearing blocks 36 slidably carried by the spaced parallel side members 12 of the vehicle frame. The bearing blocks 36 are snugly but slidably arranged within the side members 12 and are yieldably held in position by pairs of contractile coil springs 38 anchored at their outer ends to the frame by bolts or rivets 40 and at their other ends to the blocks by pins 41. The contractile coil springs 38 are possessed of sufficient stoutness to promptly return the block to its normal position upon the release of pressure or unusual strain. With reference to Fig. 4, it will be observed that the pins 41 are extended through pairs of slots 42 in the side members 12 which slots serve as a means for limiting the endwise movement of the blocks. It will be apparent, therefore, that in addition to connecting the springs 38 to the blocks, the bolts 41 serve to slidably connect the blocks 36 to the frame in such a manner that the longitudinal movement of the blocks is limited.

The crank shaft 34 may be rocked by a handle or lever 43 connected to the same by an attaching lug 44. The upper or free end portion of the lever or handle 43 may be drawn rearwardly by a corresponding movement of the hand of the operator for engaging the forward set of rollers 28 with the annulus or laterally projecting flange 32 of the drum. With the forward set of rollers 28 thus brought firmly into contact with the inner face of the flange 32, the movement of the vehicle is retarded or slowed down. By reason of the fact that but small portions of the flanges 32 are engaged at one time by the rollers 28, any heat generated as the result of friction between the rollers and the flange is dissipated during the rotation of the flange. When it is desired to lock the rollers 28 firmly in engagement with the inner face of the flange 32, the lever may be engaged with any one of a series of notches 46 formed in a segmental rack 48 mounted upon the floor board 50 of the motor vehicle. With reference to Fig. 5, it will be noted that the handle 43 is capable of being secured in various positions for rendering the braking apparatus capable of a variety of adjustments.

The handle or lever 43 is provided with a laterally projecting foot pedal 52 which is adapted to be engaged by one foot of the operator of the vehicle for moving the handle forwardly and downwardly when it is desired to engage the rear set of rollers 24 with the inner faces of the drum flanges. When the handle 43 is moved forwardly and downwardly, the rods 20 are moved rearwardly for securely engaging the rear set of rollers with the drum.

In yieldably and slidably connecting the transversely extending shaft 34 to the vehicle frame through the medium of the contractile coil springs 38, shocks received by the vehicle as the result of encountering inequalities in the line of travel are not transmitted to the braking apparatus and therefore the shoes may be uniformly and firmly engaged with the flanges of the brake drums. In thus yieldably and slidably connecting the shaft to the vehicle frame, the operator is not subjected to shocks when operating the handle 43.

With reference to the foregoing description taken in connection with the accompanying drawing, it will be observed that a braking system constructed in accordance with this invention is especially adapted for use on vehicles operating in hilly sections where it is frequently necessary to descend long grades. As above set forth the rollers and the brake drums are prevented from becoming overheated as the result of continued operation of the brake on a long incline.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. The combination with a brake drum having a laterally projecting annular flange, of an operating rod extending along one side of said drum, shoes rotatably carried by said operating rod and adapted for engaging said annular flange, and an operating device for said rod.

2. The combination with a brake drum having a laterally projecting annular flange, of an operating rod extending along one side of said drum, shoes rotatably carried by said operating rod and adapted for engaging said annular flange, an operating device for said rod, and means to slidably support said operating rod.

3. The combination with a brake drum having a laterally projecting annular flange, of an operating rod extending along one side of said drum, shoes rotatably carried by said operating rod and adapted for engaging said annular flange, an operating device for said rod, means to slidably support said operating rod, and means to normally space said shoes from said annular flange.

4. The combination with a vehicle frame having spaced parallel side members, of bearing blocks slidably carried by said spaced side members, a shaft carried by said bearing blocks, an operating device carried by said shaft, and a braking device connected to said shaft.

5. The combination with a vehicle frame having spaced parallel side members, of bearing blocks slidably carried by said spaced side members, a shaft carried by said bearing blocks, an operating device carried by said shaft, a braking device connected to said shaft, and means to limit the movement of said bearing blocks.

6. The combination with a vehicle frame having spaced parallel side members, of bearing blocks slidably carried by said spaced side members, a shaft carried by said bearing blocks, an operating device carried by said shaft, a braking device connected to said shaft, means to limit the movement of said bearing blocks, and spring means connected to said bearing blocks and said spaced parallel side members for yieldably securing said bearing blocks and said shaft in position.

7. A braking apparatus comprising a pair of drums having laterally projecting annular flanges, forward and rear pairs of rotatable shoes adapted for engaging the inner faces of said flanges, operating rods supporting said shoes, means engaged with said operating rods between said pairs of shoes for slidably supporting said rods, and operating devices for said rods.

In testimony whereof I affix my signature.

FRANK B. SNYDER. [L. S.]